3,385,914
PHOSPHORUS-CONTAINING MONOMERS
Raymond R. Hindersinn, Lewiston, N.Y., and Miltiadis I. Iliopulos, Stuttgart, Germany, assignors to Hooker Chemical Corporation, Niagara Falls, N.Y., a corporation of New York
No Drawing. Filed Dec. 12, 1961, Ser. No. 158,877
3 Claims. (Cl. 260—944)

ABSTRACT OF THE DISCLOSURE

Selected phosphorus compounds, carbonyl compounds and alkanolamines are reacted to produce compounds of the formula:

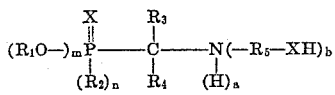

wherein $m$ and $n$ are zero to two and $m+n$ equals two; $a$ is zero to one, $b$ is one to two and $a+b$ equals two; X is oxygen or sulfur; $R_1$, $R_2$, $R_3$, and $R_4$ are organic radicals and $R_3$ and $R_4$ can also be hydrogen, and $R_5$ is an alkyl group. Such compounds can be reacted with carboxylic compounds to produce polyesters, or with epoxides to form polyethers. Such polyesters and polyethers, as well as the compounds themselves, can be reacted with isocyanates to produce polyurethane compositions. When the reaction is carried out in the presence of a foaming agent, cellular products are produced.

---

This invention relates to novel phosphorus-containing monomers that are capable of being polymerized to useful products. In other aspects, the invention relates to novel phosphorus-containing polymers such as polyesters and polyurethanes. In still further aspects, the invention relates to the production of useful polymer products such as foams, binders, castings, laminates and coating compositions.

It is known that polymers can be rendered fire-resistant by incorporating phosphorus therein. However, it is most desirable to chemically combine the phosphorus into the polymer to prevent the loss of phosphorus by leaching or weathering of the polymer. In the past, phosphorus-containing polymers have been prepared as esters of various phosphorus acids wherein the phosphorus ester linkages formed the back-bone of the polymers. This approach has not been completely successful because of the tendency of the phosphorus ester to hydrolyze in the presence of water, which phenomenon results in the degradation of the polymer and the loss of its valuable physical properties. Hence there is a need to overcome these difficulties, and yet produce useful polymers with inexpensive materials.

Accordingly, it is an object of this invention to produce polymers that are both fire-resistant and have good hydrolytic stability. It is another object of the invention to produce novel monomers that are capable of polymerizing to produce such polymers. It is a further object to produce novel polyesters that contain phosphorus which are useful in the preparation of castings, laminates, and reinforced plastic articles. It is still another object of the invention to produce novel polyurethane compositions containing phosphorus that are useful in the preparation of foams, adhesives, binders, laminates, coatings and potting compounds. Still other objects and advantages of the present invention will be apparent to those skilled in the art upon consideration of the following detailed description.

These and other objects are satisfied by providing novel compositions having the following chemical structure:

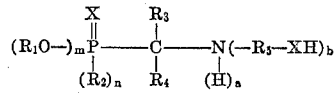

wherein $m$ and $n$ have a numerical value of zero through two, and $m+n$ equals two; $a$ has a value of zero or one, $b$ has a value of one or two, and $a+b$ equals two; X is oxygen or sulfur; $R_1$, $R_2$, $R_3$, $R_4$ are organic radicals selected from the group consisting of alkyl, cycloalkyl, alkenyl, aryl, alkylaryl, arylalkyl, and halo-substituted organic radicals of the foregoing group; and $R_3$ can also be hydrogen, and $R_5$ is an alkyl group.

These hydroxyl-containing monomers can be reacted with carboxylic compounds to produce polyesters, or with epoxides to form polyethers. When the polyesters are unsaturated they can be cross-linked to form thermosetting polymers by reaction with ethylenically unsaturated monomers and/or in the presence of free radical catalysts. The polyesters and the polyethers as well as the monomers themselves can be reacted with isocyanates to produce polyurethane compositions. When the reaction is carried out in the presence of a foaming agent, cellular products are produced.

The novel monomers of the invention are produced by reacting together an organic compound, a carbonyl compound and a primary or secondary amine. The organic phosphites that can be used in the invention are those having the chemical formula:

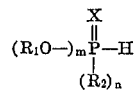

wherein $m$, $n$, $R_1$, $R_2$ and X are as defined hereinbefore. Among the preferred phosphorus compounds for use in practicing the invention are lower alkyl phosphites such as dimethyl phosphite and lower alkenyl phosphites such as diallyl phosphite. Other specific phosphites that can be used are those wherein the radicals $R_1$ and $R_2'$ are methyl, ethyl, isopropyl, butyl, hexyl, n-octyl, 2-ethylhexyl, decyl, hexadecyl, phenyl, benzyl, tolyl, cyclohexyl, allyl, crotonyl, beta-chloroethyl, beta-bromoethyl, and mixtures thereof.

In general, the length of the carbon chains or number of carbon atoms in the aryl nuclei of the organic radicals of the phosphorus compounds is not critical, and can vary over wide ranges. The lower limit is the lowest possible number of carbon atoms such as one carbon atom in the alkyl groups and six carbon atoms in the aryl groups, and the upper limit is practical in nature. However, a higher percent by weight of phosphorus may be incorporated in the polymer in instances where the organic radicals attached to the phosphorus atoms are of minimum length, and thus the carbon atoms in the organic radicals $R_1$ and $R_2$ preferably should contain from one to about six to eight carbon atoms.

The carbonyl compounds are preferably aldehydes and ketones. The preferred aldehydes are those containing not more than eight carbon atoms. Suitable compounds of this class are formaldehyde, acetaldehyde, propionaldehyde, butyraldehydes, benzaldehydes, 2-ethylhexanal, ethylbutyraldehyde, heptaldehyde, and the like. The ketones that are useful in the invention have the structural formula:

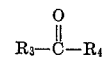

The organic radicals $R_3$ and $R_4$ are groups such as methyl, ethyl, isopropyl, butyl, hexyl, n-octyl, 2-ethylhexyl, phenyl, benzyl, tolyl, cyclohexyl, allyl, and mixtures thereof. It is generally preferred that the number of carbon atoms in each organic radical $R_3$ and $R_4$ does not exceed eight.

The preferred amines are those having the structural formula:

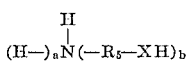

wherein $a$ has a value of zero or one, $b$ has a value of one or two, and $a+b$ equals two, X is oxygen or sulfur and the organic radical $R_5$ is an alkyl group having not more than eight carbon atoms. Typical amines for use in preparing the compounds of the invention are ethanolamine, 2-aminopropanol, 3-aminopropanol, 2-aminobutanol, 3-aminobutanol, 4 - aminobutanol, di(2 - propanol)amine, di(3-propanol)amine, di(2 - butanol)amine, di(3 - butanol)amine, di(4-butanol)amine, and the like.

In the preparation of the polyfunctional monomers of this invention, it is preferred to maintain the reaction temperature at a low level in order to inhibit the polymerization of the monomer products. Generally, it is preferred that the reaction temperature be less than eighty degrees centigrade, and preferably less than fifty degrees centigrade. The reaction can be carried out in the presence of a solvent, if desired, the only requirement being that the solvent is not reactive with respect to any of the reactants. Suitable solvents are alcohols, such as methanol, isopropanol, butanol and the like; ethers such as diethyl ether, and dioxane, and hydrocarbons such as hexane, heptane, octane, benzene, and cyclohexane.

The following examples illustrate the preparation of the monomers of the invention.

Example 1

A. PREPARATION OF DIMETHYL-N-(2'-HYDROXYETHYL)-2-AMINOISOPROPYL-2-PHOSPHONATE

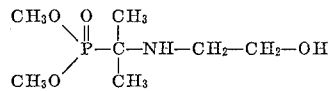

Twenty-two grams of dimethylhydrogenphosphite, 12.2 grams of ethanolamine and two hundred milliliters of methanol were mixed to yield a homogeneous solution. Anhydrous sodium sulfate (50.0 grams), was added to the solution. A solution of 11.6 grams of acetone in fifty milliliters of absolute methanol was added dropwise over a period of approximately ten minutes to keep the temperature of the reaction mixture under fifty degrees centigrade. The hot mixture was stirred for about two hours at room temperature until the temperature of the reaction was twenty-five degrees centigrade. The drying agent was filtered off and the solvent was evaporated.

The yield of crude material was eighty-nine to ninety-five percent. The product was an almost odorless, colorless oil.

*Analysis.*—Calcd. for $C_7H_{18}NO_4P$: P, 14.66 percent. Found: P, 15.0 percent.

B. PREPARATION AND CHARACTERIZATIONS OF THE PICRATE OF DIMETHYL-N-(2' - HYDROXYETHYL)-2-AMINOISOPROPYL-2-PHOSPHONATE

Formula:

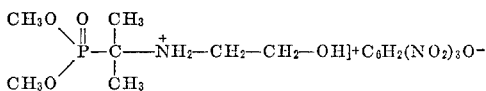

To a solution of 1.83 grams of dimethyl-N-(2'-hydroxyethyl)-2-amino-isopropyl-2-phosphonate in two hundred milliliters of anhydrous ether was added with stirring a solution of 3.07 grams of picric acid in four hundred milliliters of ether. A yellowish precipitate formed.

The crude picrate is soluble in alcohols, slightly soluble in benzene and hydrocarbons.

The crude picrate is recrystallized from hot chloroform by adding ether to the cloud point and cooling the solution to minus twenty degrees centigrade. It can also be recrystallized from ethylacetate ether mixtures. The purified salt, crystallizing as yellow needles, sinters at one hundred and twenty-seven degrees centigrade and melts at 128.5 to one hundred and twenty-nine degrees centigrade (uncorrected) with decomposition.

*Analysis percent.*—Formula: $C_{13}H_{21}N_4O_{11}P$. Calculated: C, 35.46; H, 4.80; N, 12.72; P, 7.03. Found: C, 35.47; H, 4.88; N, 12.73; P, 6.88; 7.04 (flame spectroscopy).

Example 2

A. PREPARATION OF DIMETHYL-N-(2'-HYDROXYETHYL)-2-AMINOETHYL-2-PHOSPHONATE

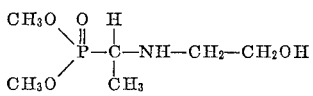

Twenty-two grams of dimethylhydrogenphosphite, 12.2 grams of ethanolamine and three hundred milliliters of absolute methanol were mixed to yield a homogeneous solution. Fifty grams anhydrous sodium sulfate were added to the solution and a solution of 8.8 grams of acetaldehyde in fifty milliliters of absolute methanol was then added dropwise with stirring over a period of approximately ten minutes, to keep the temperature of the reaction mixture under forty degrees centigrade. The hot mixture was stirred for about two hours at room temperature. The drying agent was filtered off and the solvent removed under vacuum.

The crude product obtained in a ninety percent yield was an almost colorless, odorless oil. Phosphorus found, 15.0 percent. (Calculated for $C_6H_{16}O_4NP$): 15.7 percent.

B. PREPARATION AND CHARACTERIZATION OF THE PICRATE OF DIMETHYL-N-(2' - HYDROXYETHYL-2-AMINOETHYL-2-PHOSPHONATE

Formula:

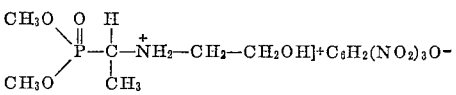

One and two-tenths grams of the crude oily dimethyl-N-(2'-hydroxyethyl)-2-aminoethyl - 2 - phosphonate was completely dissolved in a mixture of fifty parts of ether and twenty-five parts of methanol by volume. A solution of 3.5 grams of picric acid in a mixture of three hundred cc. of ether and twenty cc. of methanol was then added.

The turbid solution was filtered and the filtrate evaporated to dryness at twenty-five degrees centigrade under sixteen millimeters Hg. The crude picrate was recrystallized twice from hot ethyl-acetate by cooling at minus twenty degrees centigrade.

The yellow crystalline product sinters at one hundred and nine degrees centigrade, and melts at 111.5 to 112.5 degrees (uncorrected) with decomposition.

*Analysis percent:* Formula: $C_{12}H_{19}O_{11}N_4P$. Calculated: C, 33.81; H, 4.49; N, 13.14; P, 7.26. Found: C, 33.80; H, 4.59; N, 13.17; P, 7.49; 7.18 (flame spectroscopy).

Example 3

Using the same general procedure as in the foregoing examples, 15.6 grams of acetone was added portionwide with stirring into a solution of 22.0 grams of dimethyl hydrogen phosphite and 21.02 grams diethanolamine dissolved in one hundred and fifty milliliters of methanol and containing fifty grams of anhydrous sodium sulfate. The temperature rose to thirty degrees centigrade during the addition.

The reaction mixture was refluxed for five minutes and, after cooling and filtering off the drying agent, the solvent was removed as in Example 1.

The crude product is a very viscous, almost colorless liquid. Phosphorus found: 12.9 percent (calculated for $C_9H_{22}O_5NP$ 12.13 percent). The compound is named dimethyl - N,N - bis(2-hydroxyethyl)-2-aminoisopropyl-2-phosphonate.

Example 4

Twenty-two grams of dimethyl phosphite was dissolved in one hundred and fifty milliliters methanol. To the mixture was added fifty grams anhydrous sodium sulfate and a solution of 11.6 grams of acetone and twenty-five milliliters of methanol. Thereafter, 12.2 grams of ethanolamine dissolved in twenty milliliters methanol was added dropwise over a period of four minutes, during which time the temperature rose to forty-one degrees centigrade. The reaction mixture was stirred for several hours and allowed to stand. The sodium sulfate was removed by suction filtration and the solvent evaporated to provide a ninety-five percent yield of crude product.

Example 5

To a mixture of 234.2 grams of diphenyl phosphite and one hundred milliliters methanol was added 61.1 grams of ethanolamine. The temperature rose to one hundred and twelve degrees centigrade, after which an additional one hundred and fifty milliliters of methanol were added. The reaction mixture was agitated for nearly two hours. To a mixture of two hundred and forty-seven grams of the resulting solution and 31.5 grams of anhydrous sodium sulfate was added dropwise with agitation over a six minute period, a solution of 36.3 grams of acetone and twenty-five milliliters of methanol. The reaction was allowed to stir for fifteen minutes.

Example 6

To a mixture of 234.2 grams of diphenylphosphite and one hundred and fifty milliliters of methanol was added a solution of 72.6 grams of acetone in fifty milliliters of methanol. An additional fifty milliliters of methanol were added to the reaction mixture and after ten minutes, sixty-three grams anhydrous sodium sulfate was added. Thereafter 61.1 grams ethanolamine were added dropwise with agitation over a period of twelve minutes. After standing at room temperature for a period of time, the volatiles were evaporated and the crude product weighed three hundred and seventy-eight grams.

The polyfunctional monomers of this invention readily react with polycarboxylic compounds to form polyesters. The preferred carboxylic compounds are the carboxylic acids, acid halides and acid anhydrides, and mixtures thereof. The carboxylic compounds can be saturated or unsaturated or mixtures thereof depending upon the intended use for the polyesters. Likewise the polycarboxylic compounds can be aliphatic, cycloaliphatic, aromatic or heterocyclic. Illustrative polycarboxylic compounds include the following: phthalic acid, isophthalic acid, terephthalic acid; tetrachlorophthalic acid; maleic acid, dodecylmaleic acid; octadecenylmaleic acid; fumaric acid; aconitic acid; itaconic acid; trimellitic acid; tricarballylic acid; 3,3'-thiodipropionic acid; 4,4'-sulfonyldihexanoic acid; 3-octenedioic-1,7-acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12 - eicosadienedioic acid; 8-vinyl-10-octadecenedioic acid; and the corresponding acid anhydrides, acid chlorides and acid esters, such as phthalic anhydride, phthaloyl chloride, and the dimethyl ester of phthalic acid. The resins can be modified for special properties by using other selected polycarboxylic compounds. For example, 1,4,5,6,7,7 - hexachlorobicyclo - (2.2.1)-5-heptene-2,3-dicarboxylic anhydride or acid and tetrachlorophthalic anhydride or acid can be used to impart additional flame resistance to the composition. The monomers of this invention can also be reacted with monobasic acids, such as acetic acid, propionic acid, butyric acid and the like, to produce esters that are useful as plasticizers.

Highly useful polyethers are prepared by reacting the monomers of this invention with epoxides. Monomeric and polymeric epoxides can be used in the practice of the invention. Examples of mono-epoxides that may be employed in the practice of the invention are ethylene oxide, propylene oxide, butylene oxide, isobutylene oxide, cyclo-hexane oxide, 2,3-epoxyhexane, 3-ethyl-2,3-epoxyoctane, epichlorohydrin, epibromohydrin, styrene oxide, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl)ethylene oxide, $C_{16}H_{33}OC_6H_4SO_2NHCH_2CH\underset{O}{\overset{\diagdown \diagup}{\text{---}CH_2}}$, $(C_{12}H_{25})NCH_2\text{---}CH\underset{O}{\overset{\diagdown \diagup}{\text{---}CH_2}}$ and the like. The preferred monoepoxides are the monoepoxide substituted hydrocarbons, the monoepoxy-substituted ethers, sulfides, sulfones and esters wherein the said compounds contain no more than eighteen carbon atoms. Typical diepoxides are: 3,4-epoxy-6-methylcyclohexylmethyl - 3,4 - epoxy-6-methylcyclohexanecarboxylate, dicyclopentadiene dioxide, limonene dioxide, 4,4'-(diglycidyl)diphenylpropane, vinylcyclohexane dioxide. Examples of suitable polyepoxides are: epoxidized vegetable oils, and novolak polyglycidyl ethers.

The esterification or etherification of the phosphorus-containing monomers of this invention can be carried out at elevated temperatures, preferably not over one hundred and fifty degrees centigrade. When polycarboxylic acids are used, the progress of the esterification reaction can be monitored by measuring the quantity of water of esterification that is produced. Small quantities of toluene or xylene can be used as azeotroping agents to facilitate removal of the water. When acid halides are used, it is preferred to use solvents during the reaction. The acid halide can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reactions involving the acid halides can be monitored by measuring the quantity of hydrogen halide evolved during the course of the esterification. Moreover, in the reactions involving the acid halides, it is often advantageous to use a hydrogen halide acceptor such as amines and strong bases. Preferred acceptors are tertiary amines such as pyridines, and triethylamine.

The unsaturated polyesters produced in accordance with this invention can be cured by cross-linking in the presence of a catalytic amount of a conventional polymerization catalyst for addition polymerization of ethylenically unsaturated materials, including free radical catalysts such as benzoyl peroxide and other organic peroxides. The polymer can also be cured by copolymerization with an ethylenically unsaturated monomeric material copolymerizable therewith, and preferably in the presence of a catalytic amount of a polymerization catalyst such as mentioned above.

The ethylenically unsaturated monomers which can be used in curing or cross-linking the ethylenically unsaturated polymers of the present invention can be varied widely. While other materials can be used, it is preferred that addition polymerization be practiced since no by-product ammonia, water, etc., is formed and the problems resulting therefrom are not experienced. The monomers useful in curing the thermoplastic unsaturated polymers include vinylidene compounds or mixtures thereof capable of cross-linking ethylenically unsaturated polymer chains at their points of unsaturation and usually they contain the reactive group $H_2C=C\text{---}$. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis (allyl carbonate), triallyl phosphate and other allyl esters, and vinyl toluene, diallyl chlorendate, diallyl tetrachlorophthalate, the lower aliphatic esters other than methyl of methacrylic and acrylic acids, the diacrylate, dimethacrylate, diethacrylate esters of ethylene glycol, etc.

The monomer can be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Castings may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as Orlon, mineral fibers such as asbestos, natural fibers such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers and dyes.

Novel polyurethane compositions are prepared by reacting the phosphorus-containing monomers and the polyesters and polyethers of this invention with organic polyisocyanates. When polyurethane foams are desired, the reaction with isocyanates is conducted in the presence of a foaming agent. In preparing these polyurethane compositions, the components are preferably reacted in a ratio sufficient to provide about eighty-five to one hundred and fifteen percent of isocyanate groups with respect to the total number of reactive groups such as amino, hydroxyl and carboxyl present in the hydroxyl-containing material (and the foaming agent, if one is provided). The reaction temperature generally is about twenty to about one hundred and eighty degrees centigrade, although higher and lower temperatures can be used.

It is also within the scope of the invention to blend the phosphorus-containing monomers and the polyesters and polyethers containing the phosphorus-containing compounds of this invention with other hydroxyl-containing materials, such as polyesters and polyethers prior the reaction with an organic polyisocyanate. Such additional polyesters are the reaction products of polycarboxylic acids and polyhydric alcohols, while the polyethers usually comprise the reaction product of a monoepoxide and a compound selected from the group consisting of a polyhydric alcohol, polyphenolic compound and a polycarboxylic acid. The polycarboxylic compounds and epoxides which can be employed are any of the polycarboxylic compounds and monepoxides disclosed hereinbefore. The preferred polycarboxylic compounds are the aliphatic and cycloaliphatic dicarboxylic acids containing no more than fourteen carbon atoms, and the aromatic dicarboxylic acids containing no more than fourteen carbon atoms. The preferred monoepoxides are the mono- epoxide-substituted hydrocarbons, the monoepoxy-substituted ethers, sulfides, sulfones and esters wherein said compounds contain no more than fourteen carbon atoms. Polyphenolic compounds which can be employed are the reaction products of phenolic compounds with aldehydes, such as phenol-formaldehyde resins. Illustrative polyhydric alcohols include the following: glycerol; polyglycerol; pentaerythritol; mannitol; trimethylol propane; sorbitol; trimethylolethane; butanediol; pentanediol; 1,2, 6-hexanetriol; 2,2-bis(4-hydroxyphenyl)-propane, and the like. Preferred polyols are the open-chain aliphatic polyhydric alcohols and polyalkylene ether polyols possessing from two to six esterifiable hydroxyl groups and containing no more than twenty carbon atoms.

A large number of various organic polyisocyanates can be used. Of the hydrocarbon polyisocyanates, the aryl and alkaryl polyisocyanates of the benzene and naphalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them phenyl diisocyanate; alpha-naphthyl diisocyanate; 4-tolylene diisocyanate; n-hexyl diisocyanate; methylene-bis-(4-phenyl isocyanate); 3,3'-bitolylene-4,4'-diisocyanate; 3,3'-dimethoxy-4,4'-biphenylene diisocyanate; 1,5-naphthalene diisocyanate; 2,4-chlorophenyl diisocyanate; hexamethylene diisocyanate; ethylene diisocyanate; trimethylene diisocyanate; tetramethylene diisocyanate, pentamethylene diisocyanate; decamethylene diisocyanate; 1,3 - cyclopentylene diisocyanate; 1,2-cyclohexylene diisocyanate; 1,4 - cyclohexylene diisocyanate; cyclopentylidene diisocyanate; cyclohexylidene diisocyanate; p-phenylene diisocyanate; m-phenylene diisocyanate; 4,4-diphenylpropane diisocyanate; 4,4'-diphenylmethane diisocyanate; 1-methyl-2,4-phenylene diisocyanate; 4,4'-diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; butylidene diisocyanate; 1,3,5-benzene triisocyanate; 2,4,6-tolylene triisocyanate; 2,4,6-monochlorobenzene triisocyanate; 4,4',4''-triphenylmethane triisocyanate; polymethylene polyphenylisocyanate and mixtures thereof. Higher isocyanates are provided by the liquid reaction products of (1) diiosocyanates and (2) polyols or polyamines; etc. In addition, isothiocyanates and mixtures of isocyanates may be employed. Also contemplated are the many impure or crude polyisocyanates that are commercially available.

Reaction catalysts can be used in producing the polyurethane compositions. That catalyst employed may be any of the known conventional catalysts for isocyanate reactions, such as tertiary amines, for example, triethylamine, N-methyl morpholine, triethanolamine, etc., or antimony compounds such as antimony caprylate, antimony naphthenate, or antimonous chloride. In addition, tin compounds may be employed such as dibutyltin dilaurate, tri - n - octyltin oxide, hexabutylditin, tributyltin phosphate, or stannic chloride. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

When the polyurethane compositions of the invenion are formed, any foaming agent commonly used in the art can be employed. Foaming agents in this are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in United States Patent 2,865, 869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents may be employed.

The following examples illustrate the preparation of novel polymeric compositions of the phosphorus-containing compounds of this invention.

Example 7

An isocyanate prepolymer is prepared by adding 248.75 parts of a commercial mixture of eighty percent of 2,4-tolylene diisocyanate and twenty percent 2,6-tolylene diisocyanate to a reaction vessel and heating this material to ninety degrees centigrade. While vigorously agitating the isocyanate, 54.2 parts of dimethyl N-(2′-hydroxymethyl)-2-aminoisopropyl-2-phosphonate is added dropwise while the temperature is maintained at or below one hundred and seven degrees centigrade. Following completion of the addition, the homogeneous reaction mixture is stirred at one hundred degrees centigrade for an additional thirty minutes and allowed to cool to room temperature under anhydrous conditions.

One hundred and twenty-five parts of the prepolymer is stirred with twenty-eight parts of trichlorofluoromethane until the mixture is homogeneous. To the mixture is added one hundred parts of a commercial polyester, 0.25 part of dibutyltin dilaurate, 0.25 part of N-methyl-morpholine and 0.5 part of silicone emulsifying agent, the mixture is stirred vigorously for thirty seconds and the prefoam is poured into a mold and permitted to stand at room temperature. The foam is cured for twenty minutes at eighty degrees centigrade. The foam product has a fine cell structure, a density of 2.5 pounds per cubic foot, and is self-extinguishing when ignited.

Example 8

The prepolymer described in Example 1 is blended in a mixing vessel with one hundred parts of a commercial polyester, 0.1 part of N-methylmorpholine and 0.5 part of a silicone emulsifying agent, and the mixture is stirred vigorously for one minute. The resulting polyurethane composition is applied to the surface of a sheet of steel and forms a durable coating that is highly flame-resistant and water-resistant.

Example 9

A phosphorus-containing polyester was prepared as follows:

A polyester was prepared by reacting ten moles of trimethylolpropane and six moles of adipic acid; the resulting hydroxyl number was five hundred and four. To five hundred grams of this polyester was mixed one hundred and twenty-five grams of dimethyl-N-(2′-hydroxyethyl)-2-amino-isopropyl-2-phosphonate. The mixture, which was non-homogeneous, was heated and stirred at one hundred and ten degrees centigrade for 4.5 hours under vacuum. Methanol vapor was condensed and recovered from the reaction mixture. The resulting product was clear and had a phosphorus content of about 3.1 percent and a Gardner viscosity of two hundred and forty seconds at fifty degrees centigrade.

Example 10

The polyester produced in accordance with Example 9 was incorporated into a polyurethane composition as follows:

A polyurethane prepolymer was prepared by reacting eighty parts of a commercial mixture of tolylene diisocyanate isomers and twenty parts of the trimethylpropane-adipate prepared in Example 9. To one hundred and twenty grams of the prepolymer was added one hundred grams of the phosphorus-containing polyester produced in Example 9, 0.5 gram silicone oil, 0.5 gram tetramethylbutane diamine and thirty grams of trichlorofluoromethane. The mixture was stirred for thirty seconds and poured into a mold. The resulting foam had a phosphorus content of about 1.3 percent, and was self-curing, self-extinguishing on ignition and had a low density.

In instances wherein the phosphorus-containing compounds of this invention are utilized with the hydroxyl-containing polymeric materials such as the polyesters and polyethers disclosed herein, it is preferred that said hydroxyl-containing polymeric material have a hydroxyl number between thirty and nine hundred and fifty.

As shown in the foregoing Example 9, the phosphorus-containing compounds of this invention can be reacted with polyesters, that are the reaction products of polycarboxylic compounds and polyhydric alcohols of the type disclosed hereinbefore, to produce phosphorus-containing polyesters. Hence it is apparent that while this invention has been described with reference to certain specific embodiments, many variations will be recognized by those skilled in the art that do not depart from the spirit and scope of the invention.

We claim:

1. A compound having the formula:

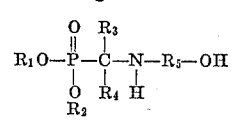

wherein $R_1$ and $R_2$ are alkyl of 1 to 8 carbon atoms, cycloalkyl of 3 to 8 carbon atoms, alkenyl of 3 to 4 carbon atoms, aryl of 6 to 8 carbon atoms, alkylaryl of 7 to 8 carbon atoms, arylalkyl of 7 to 8 carbon atoms, or halo-substituted organic radicals of the foregoing group wherein the halogen is chlorine or bromine; $R_3$ and $R_4$ are hydrogen, alkyl of 1 to 8 carbon atoms, cycloalkyl of 3 to 8 carbon atoms, alkenyl of 3 to 4 carbon atoms, aryl of 6 to 8 carbon atoms, alkylaryl of 7 to 8 carbon atoms, or arylalkyl of 7 to 8 carbon atoms; and $R_5$ is an alkyl group of 1 to 8 carbon atoms.

2. Dimethyl - N - (2′-hydroxyethyl)-2-aminoisopropyl-2-phosphonate.

3. Dimethyl - N - (2′-hydroxyethyl)-2-aminoethyl-2-phosphonate.

References Cited

UNITED STATES PATENTS 2,635,112 4/1953 Fields _____ 260—461.310
2,847,442 8/1958 Sallmann _____ 260—461.310
3,076,010 1/1963 Beck et al. _____ 260—461

JOSEPH P. BRUST, *Primary Examiner.*

P. H. HELLER, *Assistant Examiner.*